United States Patent
Rane et al.

(10) Patent No.: US 8,634,606 B2
(45) Date of Patent: Jan. 21, 2014

(54) METHOD AND SYSTEM FOR BINARIZATION OF BIOMETRIC DATA

(75) Inventors: Shantanu Rane, Cambridge, MA (US); Abhishek Nagar, Lansing, MI (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 910 days.

(21) Appl. No.: 12/688,089

(22) Filed: Jan. 15, 2010

(65) Prior Publication Data

US 2010/0119126 A1 May 13, 2010

Related U.S. Application Data

(63) Continuation-in-part of application No. 12/570,072, filed on Sep. 30, 2009, which is a continuation-in-part of application No. 11/928,687, filed on Oct. 30, 2007, which is a continuation-in-part of application No. 11/564,638, filed on Nov. 29, 2006, now Pat. No. 7,779,268, which is a continuation-in-part of application No. 11/218,261, filed on Sep. 1, 2005, now Pat. No. 7,620,818, which is a continuation-in-part of application No. 11/006,308, filed on Dec. 7, 2004, now abandoned.

(51) Int. Cl.
G06K 9/00 (2006.01)

(52) U.S. Cl.
USPC .......................................................... 382/124

(58) Field of Classification Search
None
See application file for complete search history.

(56) References Cited

U.S. PATENT DOCUMENTS

| | | | | |
|---|---|---|---|---|
| 4,083,035 | A * | 4/1978 | Riganati et al. | 382/125 |
| 4,151,512 | A * | 4/1979 | Riganati et al. | 382/125 |
| 5,555,314 | A * | 9/1996 | Nakajima | 382/124 |
| 6,314,196 | B1 * | 11/2001 | Yamaguchi et al. | 382/125 |
| 7,035,444 | B2 * | 4/2006 | Kunieda et al. | 382/125 |
| 7,079,672 | B2 * | 7/2006 | Matsumoto et al. | 382/125 |
| 7,206,449 | B2 | 4/2007 | Raskar | |
| 7,369,688 | B2 * | 5/2008 | Ser et al. | 382/124 |
| 8,032,760 | B2 * | 10/2011 | Tuyls et al. | 713/186 |
| 8,280,640 | B2 * | 10/2012 | Levin et al. | 702/19 |
| 2006/0104484 | A1 * | 5/2006 | Bolle et al. | 382/115 |
| 2008/0209227 | A1 * | 8/2008 | Venkatesan et al. | 713/186 |

* cited by examiner

*Primary Examiner* — Samir Ahmed
(74) *Attorney, Agent, or Firm* — Dirk Brinkman; Gene Vinokur

(57) ABSTRACT

Embodiments of the invention disclose a system and a method for transforming a biometric of a user to a binary feature vector suitable for user authentication, comprising steps of: partitioning the biometric into a set of regions, wherein each region is a contiguous region confining a part of the biometric; determining, for each region, biometric parameters; applying, to each region, binary logical conditions to produce at least one bit of the binary feature vector, wherein the applying is performed by a processer; and outputting the binary feature vector.

10 Claims, 6 Drawing Sheets

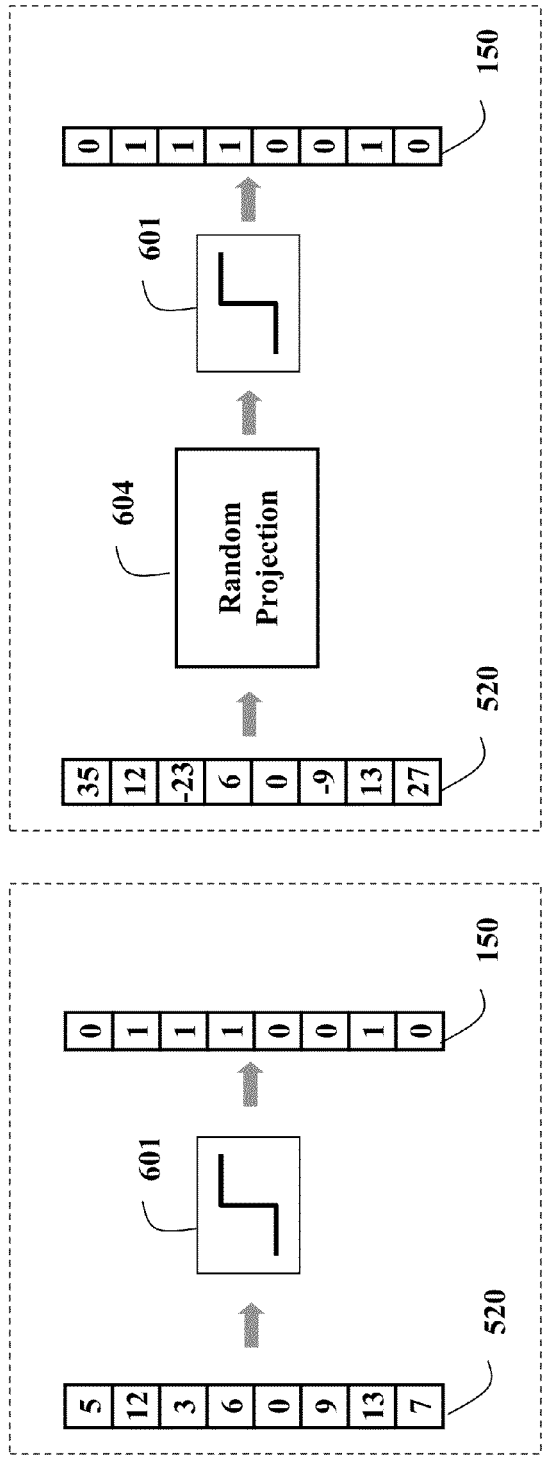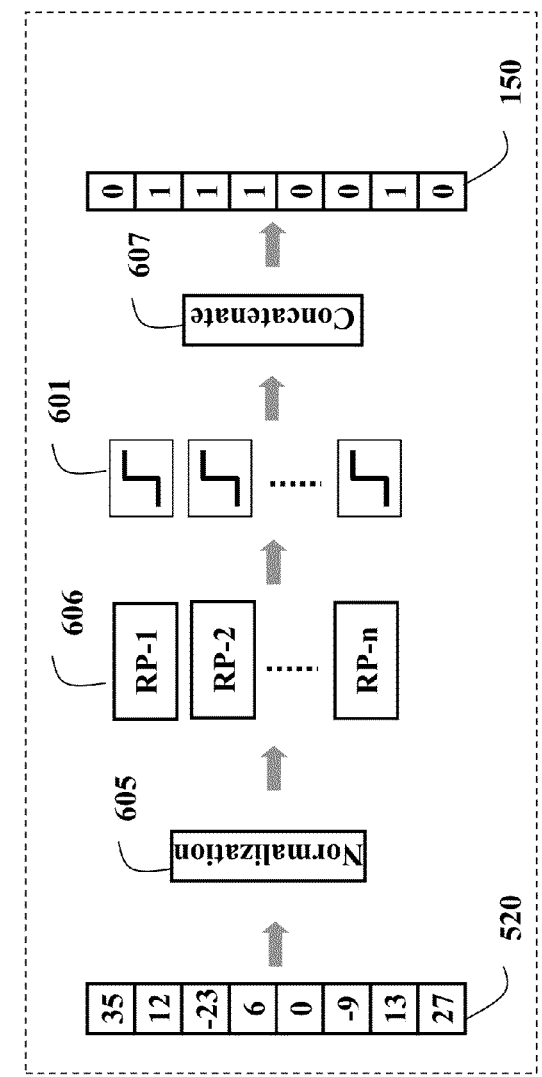
Fig. 6A
Fig. 6B
Fig. 6C

METHOD AND SYSTEM FOR BINARIZATION OF BIOMETRIC DATA

RELATED APPLICATION

This is a Continuation-in-Part Application of U.S. Ser. No. 12/570,072, "Application of Method and System for Authenticating Reliable Biometric Data," filed by Wang et al., on Sep. 30, 2009, which is a Continuation-in-Part Application of U.S. Ser. No. 11/928,687, "Pre-processing Biometric Parameters before Encoding and Decoding," filed by Yedidia et al., on Oct. 30, 2007, which is a Continuation-in-Part Application of U.S. application Ser. No. 11/564,638, "Biometric Based User Authentication and Data Encryption," filed by Draper et al., on Nov. 29, 2006, now U.S. Pat. No. 7,779,268 which is a Continuation-in-Part Application of U.S. application Ser. No. 11/218,261, "Biometric Based User Authentication and Data Encryption," filed by Martinian et al., on Sep. 1, 2005, now U.S. Pat. No. 7,620,818 U.S. Publication 2006-0123241, which is a Continuation-in-Part Application of U.S. application Ser. No. 11/006,308, "Biometric Based User Authentication with Syndrome Codes," filed by Martinian et al. on Dec. 7, 2004, now abandoned U.S. Publication 2006-0123239, all claimed priority from and incorporated herein by reference.

FIELD OF THE INVENTION

The invention relates generally to the fields of biometrics, and more particularly to acquiring and binarizing biometric parameters for user authentication and data encryption.

BACKGROUND OF THE INVENTION

User authentication with biometric data (a biometric), e.g., speech, a fingerprint, iris appearance is an alternative to conventional typed passwords. The biometric does not need to be memorized, and is difficult to replicate. However, the biometric is inherently subject to noise, and can have some variation from one measurement to another, which makes biometric authentication more challenging than conventional password-based methods.

That problem can be solved in part by storing reference biometrics accessible by an authentication device. Then, pattern matching can be used to compare current biometrics to be authenticated with the reference biometrics. However, that method can become a security threat when the reference biometrics are compromised.

Another method to solve this problem by using "cancelable" biometrics, wherein biometric templates are generated using a specific transformation of the biometric, and the templates can be revoked at any time. However, it is difficult to guarantee security if the cancelable transformation is compromised. Further, it is difficult to provide provable security guarantees for cancelable transformations.

An error correction code (ECC) can correct small variations in biometric data due to noise. Furthermore, check bits of the ECC emulate a cryptographic hash of conventional password systems in the sense that, given only the check bits, the biometric data cannot be recovered. However, state of the art methods based on ECC have a high false reject rate (FRR) because it is difficult to accommodate the variation of biometric samples across different measurements taken from a particular user. Therefore, it is difficult to design an ECC for the noisy channel between biometric measurements.

The problem was partially remedied in the context of fingerprint biometrics by the related patent applications. There, after feature transformation of the fingerprint, the biometric channel, i.e., the noisy channel between biometric measurements from a given user, is reduced to a binary symmetric channel (BSC). The advantage of this approach is that standard ECCs are readily available for the BSC.

Accordingly, it is desired to transform the biometrics before storage in such a way that the original biometric cannot be recovered from the stored information alone, but the stored information can later be combined with a probe biometric to reliably identify or authenticate a particular user.

SUMMARY OF THE INVENTION

Embodiments of our invention are based on the realization that biometrics of a user, e.g., a fingerprint, can be randomly partitioned into a set of regions such that biometric parameters extracted from each region include information about identity of a user and that biometric parameters can be binarized such that a resulting binary feature vector includes reliable information about the identity of the user and is suitable for user authentication.

One embodiment discloses a method for transforming biometrics of a user to a binary feature vector suitable for user authentication, comprising steps of: partitioning the biometrics into a set of regions, wherein each region is a contiguous region confining a part of the biometrics; determining, for each region, biometric parameters; applying, to each region, a binary logical condition to produce at least one bit of the binary feature vector, wherein the applying is performed by a processer; and outputting the binary feature vector.

Another embodiment discloses a system for transforming biometrics of a user to a binary feature vector suitable for user authentication, comprising: means for partitioning the biometrics into a set of regions, wherein each region is a contiguous region confining a part of the biometrics; means for determining, for each region, biometric parameters; a processor configured to apply, to each region, a binary logical condition to produce at least one bit of the binary feature vector; and a memory for storing the binary feature vector.

BRIEF DESCRIPTION OF THE DRAWINGS

FIGS. 6A-6C are examples of binarizations according to embodiments of the invention.

DETAILED DESCRIPTION OF THE PREFERRED EMBODIMENTS

Embodiments of our invention are based on the realization that biometrics of a user, e.g., a fingerprint, can be randomly partitioned into a set of regions such that biometric parameters extracted from each region include information about identity of a user and that biometric parameters can be binarized such that a resulting binary feature vector includes reliable information about the identity of the user and is suitable for user authentication.

System and Method Overview

Figure 1:
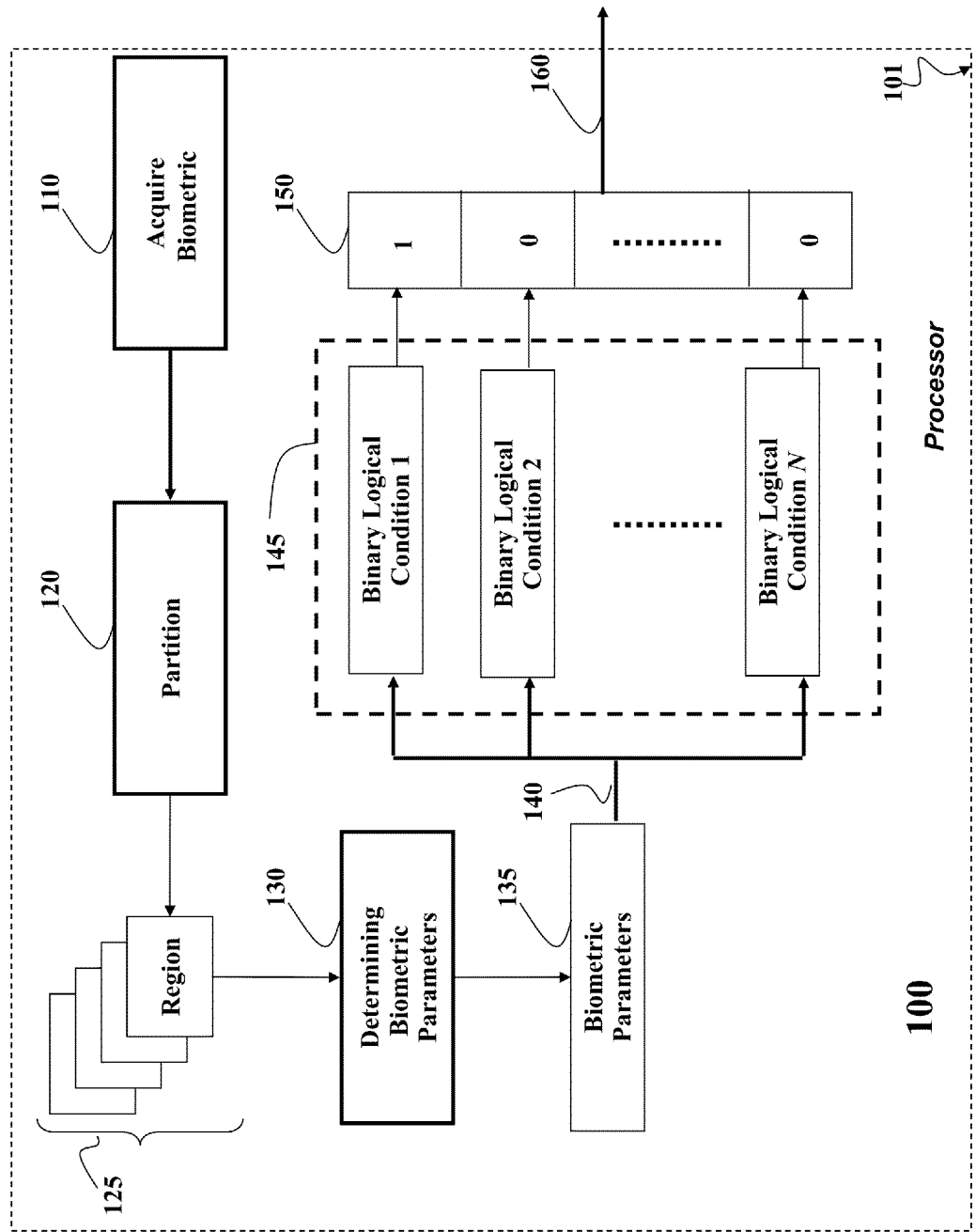
FIG. 1 is a block diagram of a method for determining a binary feature vector suitable for user authentication according embodiments of the invention.

FIG. 1 shows a computerized system and method 100 for determining binary feature vector 150 based on biometrics 110 of a user such that the binary feature vector is suitable for user authentication 160. The steps of the method can be performed by a processor 101, including memory and input/output interfaces as known in the art. The method 100 takes biometrics as input and transforms the biometrics into an output, i.e., the binary feature vector 150 suitable for user authentication.

The binary feature vector can be stored in a memory for subsequent processing, or transmitted to an authentication system (not shown). The authentication can be performed by direct matching of the binary feature vectors or using, e.g., "helper data" based systems, such as the system described in U.S. application Ser. No. 11/006,308.

The embodiments of the invention are described using fingerprint biometrics. However, some embodiments use other types of biometrics, e.g., iris, face, odor, DNA, signature, speech.

The biometrics 110 of the user are acquired and partitioned 120 into a set of regions 125. In one embodiment the regions are selected randomly, and can intersect with each other. As described in more details below, in some embodiments, the regions are contiguous regions, i.e., patches, such that borders of the patches confine a part of the biometric.

For each region, the biometric parameters 135 are determined 130 and binarized 140 based on one or more binary logical conditions 145, i.e., conditions with a yes/no answer, about the biometric parameters to produce the binary feature vector 150, e.g., a binary string 00111000101110001 . . . ."

A bit or bits determined from the aforementioned regions depend only on the portion of the biometric contained in the interior of the region, and does not depend on the portion of the biometric contained in the exterior of the region.

Partitioning of Biometrics

Figure 2:
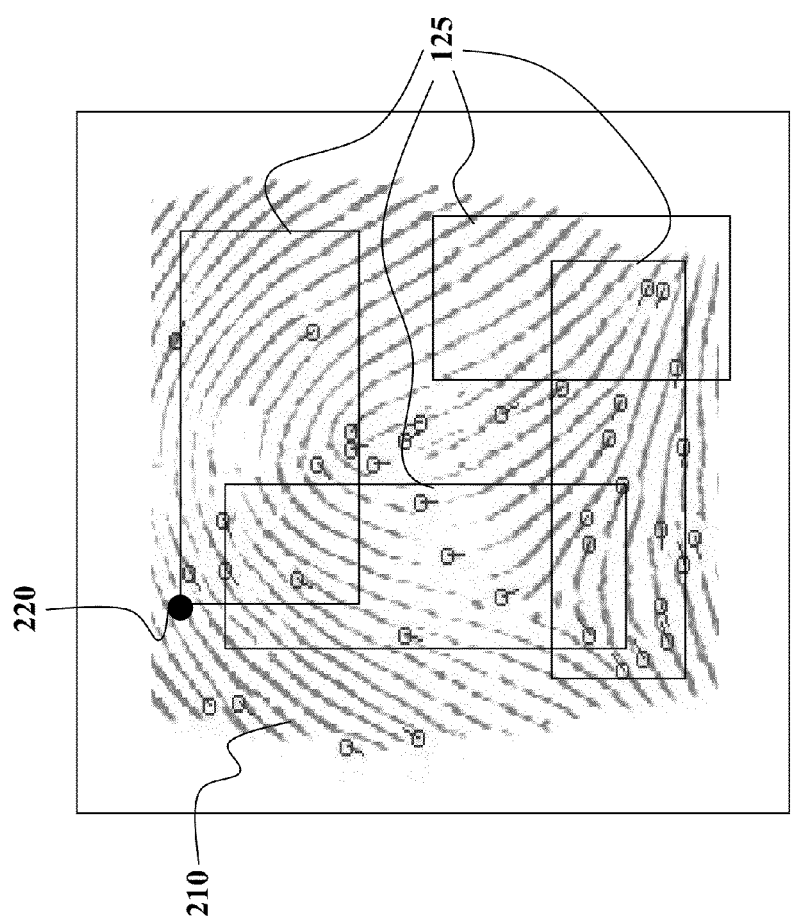
FIG. 2 is an example of partitioning a fingerprint into a set of regions.

FIG. 2 shows an example of partitioning a fingerprint 210 into a set of regions 125. For example, in one embodiment, the regions have rectangular shapes. Each rectangle is generated, for example, at an origin 220, which indicates an upper-left corner of the rectangle, and is specified with a width and a height.

A set of rectangles can be generated with random values of the origins widths and heights, or through a pre-determined arrangement. It is advantageous, however, to randomly generate the set of regions, because if the received binary feature vectors are compromised, a new set of randomly generated regions can be used to generate a completely new set of the binary feature vectors.

In the embodiments, the regions selected at random in the biometrics or biometric space. For example, in different embodiments, one or a combination of shape, dimension, location, and orientation of the regions are selected at random. Also, the regions are contagious, i.e., all points in the region are connected. Accordingly, each region separates the biometric space into an interior sub-region from which the biometric parameters for that region are extracted, and an exterior sub-region from which the biometric parameters from that region are not extracted.

In some embodiments, the partitioning minimizes the biometric parameters that may have too much correlation, or too much noise. In order to ensure that most of the regions occupy the image of the fingerprint, the image is normalized, and each region is centered at, e.g., a randomly selected minutia from a fingerprint database. The remaining parameters of the region are randomly generated.

Next, inferior or low-quality features are eliminated by discarding highly overlapping regions, because these regions generate highly correlated features. One embodiment uses the following steps to eliminate highly overlapping regions:

(1) Compute relative overlap, i.e., the ratio of volume of intersection to the volume of union, for all pairs of regions;
(2) Select the pair having highest relative overlap;
(3) Delete the region whose maximum relative overlap with the other regions is greater; and
(4) Repeat steps 2 and 3 until a desired number of nearly non-overlapping regions and/or the desired reduction in overlap are achieved.

Figure 3:
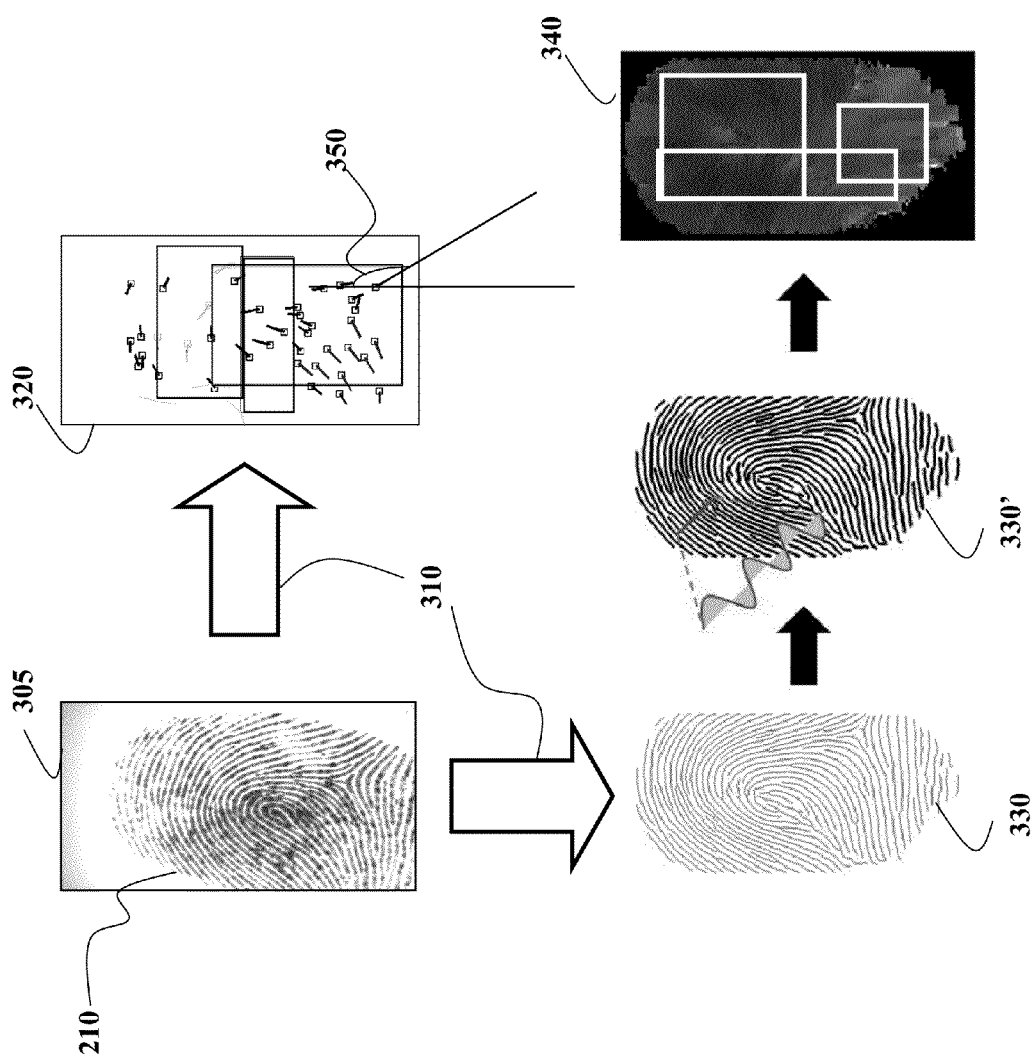
FIG. 3 is an example of representation of biometrics according different embodiments of the invention.

As shown in FIG. 3 for different embodiments, during the partitioning step, an image of the fingerprint 210 is represented 310 by a minutia map 320 and/or a ridge map 330-330' and/or by a ridge wavelength map 340. The ridge map can be a thin ridge map 330 or a thick ridge map 330'. Minutia maps 320 and ridge map images 330 and 330' can be determined by methods known in the art.

Minutia Map

The fingerprint minutia map is a data structure used to represent an image of a fingerprint. The minutia map includes minutiae in, e.g., a two- or a three-dimensional space. The minutiae are extracted from an image 305 of fingerprint ridges. Locations and orientations are associated with the minutiae, and related to ridges in the fingerprint. Specifically, each minutia is generated where a fingerprint ridge ends, or bifurcates.

Figure 4B:
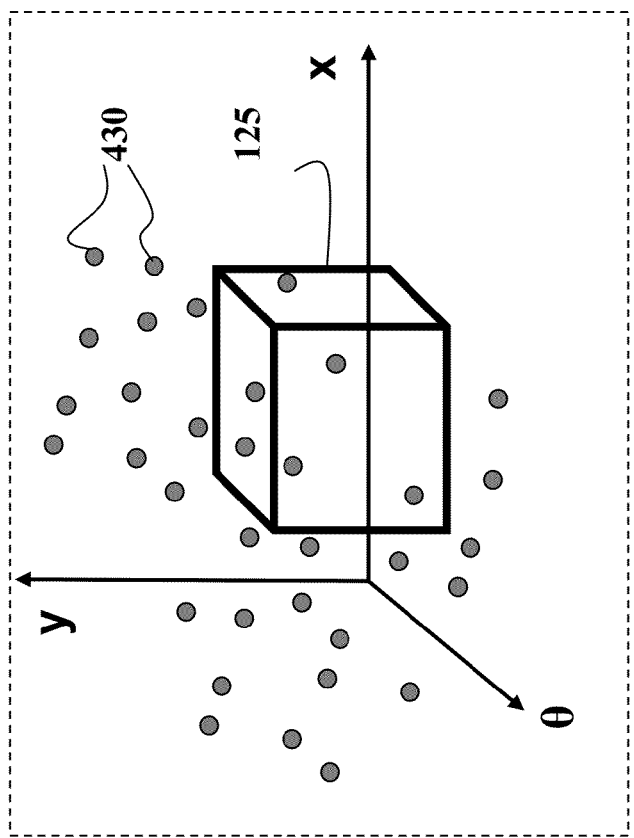
FIGS. 4A-B are examples of biometric parameters.
Figure 4A:
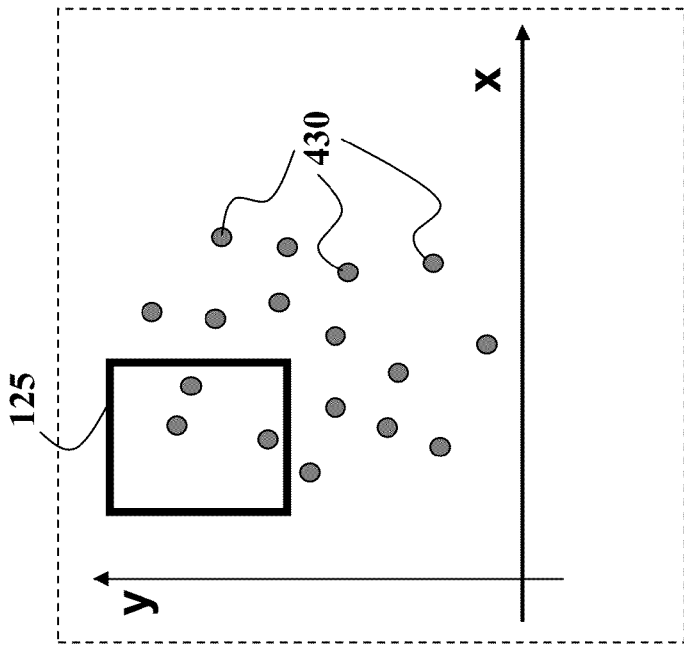

FIG. 4A shows an example of one embodiment, wherein each minutia 430 is associated with two coordinates X and Y, wherein X and Y are spatial coordinates of the minutia in the image. In this embodiment, the regions 125 are two dimensional, e.g., a square, a rectangle, a circle, or an oval.

FIG. 4B shows an example of another embodiment, which includes additional data about the fingerprints, such as orientation of the minutiae. Each minutia 430 is associated with three coordinates X, Y, and θ, wherein X and Y are the spatial coordinates of the minutia in the image 305, and θ is an angle 350 of the tangent to the fingerprint ridge from which the minutia is derived. The angle θ ranges from 0 to 360 degrees. In this embodiment, the regions 125 are three dimensional, e.g., a cube, an ellipsoid or a sphere.

Ridge Map

The fingerprint ridge map is the image 330 of the ridges of the fingerprint. The ridge map identifies fingerprint information that is sufficiently independent of the information contained in the minutiae. Sometimes, when the fingerprint image is very noisy, minutiae extraction is difficult or unreliable, but in this case the fingerprint ridges can generate more reliable features. In some embodiments, a ridge wavelength image 340 is extracted from the fingerprint ridge map.

The features extracted from fingerprint ridges are ridge orientation and ridge wavelength. The ridge orientation and the ridge wavelength are extracted for each region, as described in more details below.

Biometric Parameters

In different embodiments, the biometric parameters of the region are determined from the minutia map and/or by the ridge map. For example, in one embodiment, the biometric parameters are coordinates of the minutiae confined by the region. In another embodiment, the biometric parameters are the ridges in the image of the fingerprint. The binary feature vector is determined from the biometric parameters based on different binary logical conditions.

Binary Logical Condition

Embodiments of the invention apply binary logical conditions to the biometric parameters of the region because the binary feature vector determined from a single minutia is less reliable than the binary feature vector determined from aggregate measures calculated over the region. While fingerprint minutiae remain stable over years, coordinates of the minutiae on a minutia map vary slightly at every measurement. The minutiae may move slightly or even disappear owing to differences in finger pressure applied, or due to misalignment. Moreover, new minutiae may be inserted because of dust or cuts on a finger.

Figure 5:
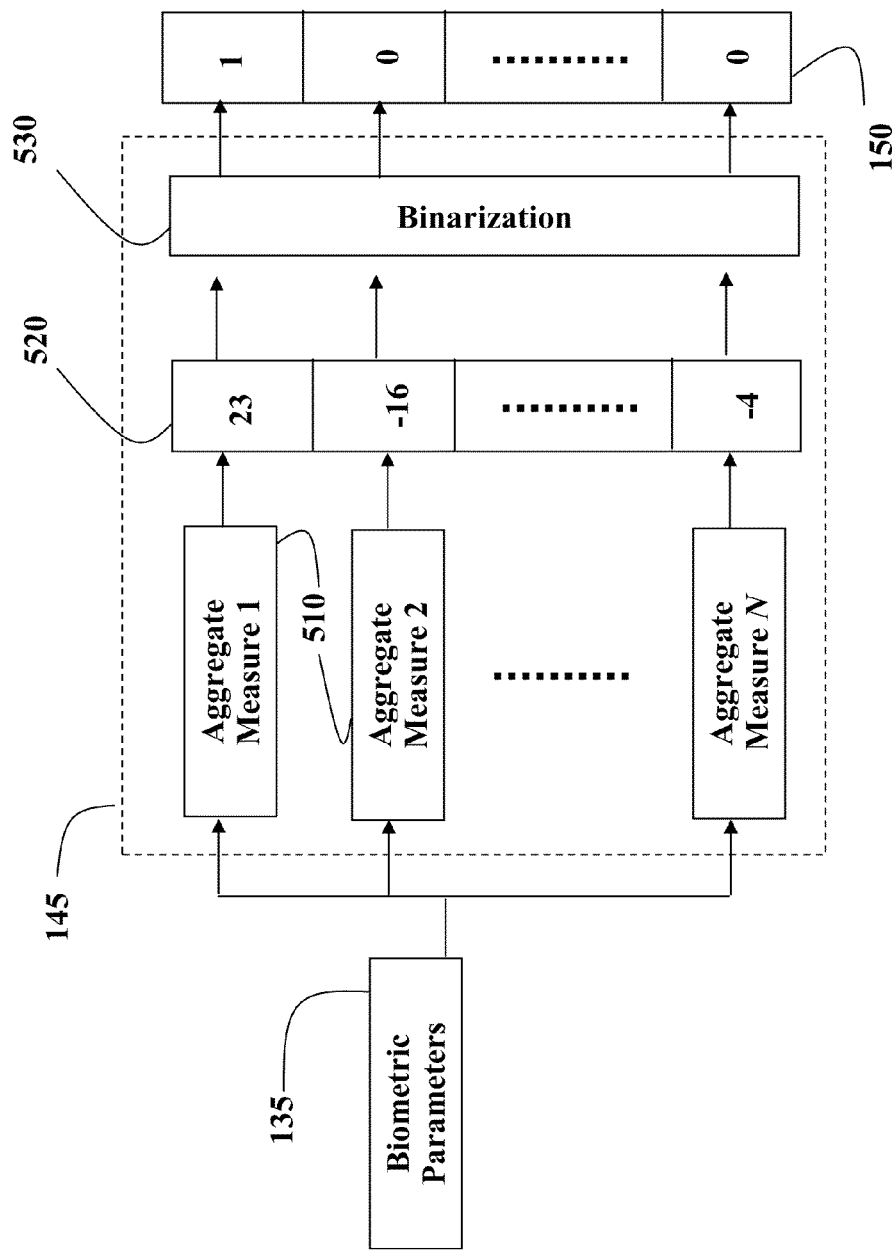
FIG. 5 is a block diagram of application of binary logical conditions according to embodiments of the invention.

As shown in FIG. 5, in different embodiments, the binary logical conditions 145 use results of different aggregation measures 510, i.e., an intermediate feature vector 520, which, after binarization 530, e.g., comparing with a threshold, produces bits for the binary feature vector 150.

In some embodiments, each region contributes to one bit of the binary feature vector. In yet another embodiment, multiple logical conditions, which are selected from the set of binary logical conditions 145, are applied to the region thereby contributing multiple bits of the binary feature vector.

Total Number of Minutiae

In one embodiment, the binary logical condition includes counting total number of minutiae in the region, i.e., the aggregate measure, and binarizing the total number with respect to a threshold. The threshold for a particular region is calculated using a training database composed of fingerprint images and/or minutia maps of a large number of users.

In one embodiment, the threshold is the median of the total number of minutiae in the region computed over all the fingerprints in the database. Using the median has the advantage that approximately half of the fingerprints produce a zero-bit from the region under consideration, while the other half would produce a one-bit from that region.

Aggregate Wall Distance

In another embodiment, the binary logical condition includes determining an aggregate wall distance of all the minutiae inside the region, and binarizing the aggregate wall distance with respect to a wall distance threshold.

Aggregate wall distance is a summation of the closest distance of each minutia from the boundary of the region, e.g., a cuboid. For example, the aggregate wall distance ($\delta$) for a cuboid-shaped region bounded by ($x_{min}$, $x_{max}$, $y_{min}$, $y_{max}$, $\theta_{min}$, $\theta_{max}$) is determined according to $$\delta = \sum_{i=1}^{t} \min(\delta_x, \delta_y, \delta_\theta, \tau_\delta), \qquad (1)$$

where t is the number of minutiae in the cuboid, $\tau_\delta$ is a tolerance value used for wall distance, and $\delta_x$, $\delta_y$, and $\delta_\theta$ $\min(|x_i-x_{min}|, |x_i-x_{max}|)$, $\min(|y_i-y_{min}|, |y_i-y_{max}|)$, and $\min(|\theta_i-\theta_{min}|, |\theta_i-\theta_{max}|)$, respectively.

The significance of the tolerance value is as follows: If all the minutiae are at distance at least $\tau_\delta$ from the boundary of the cuboid, then the aggregate wall distance is $\tau_\delta$ times the number of minutiae in the cuboid. In this embodiment, the tolerance $\tau_\delta$ de-emphasizes contribution of the minutiae close to boundary that are likely to shift out of the cuboid in the subsequent impressions due to imperfect alignment. However, other embodiments do not use this tolerance value.

In one variation of this embodiment, the threshold is determined using a training database of fingerprint images and/or minutia maps of a large number of users. For example, the threshold is a median of the aggregate wall distance in the region computed over all the fingerprints in the database.

Minutiae Average and Deviation

In another embodiment, the binary logical condition includes determining coordinates of an average minutia in the region, and binarizing the coordinates with respect to a coordinate threshold, e.g., medians of average coordinates of users. In one variation of this embodiment, the coordinates of an average minutia is determined as average coordinate of all the minutiae detected in the region. The average coordinate is yet another example of an aggregate measure computed from the minutia map.

In another embodiment, the binary logical condition includes determining coordinates of a standard deviation of all minutiae inside the region and binarizing the coordinates with respect to a standard deviation threshold, e.g., medians of standard deviations of coordinates of minutiae in the region computed over database of fingerprints.

In some embodiments, both minutiae average and minutia deviation measures include three components corresponding to the X, Y, and $\theta$ axes coordinates. Conventional formulae are used for computing the average and the standard deviation for the spatial X and Y coordinates. However, for the angle $\theta$ coordinate, the mean $\mu_\theta$ and standard deviation $\sigma_\theta$ are determined according to $$\mu_s = \frac{1}{t}\sum_{i=1}^{t} \sin\theta_i, \qquad (2)$$

$$\mu_c = \frac{1}{t}\sum_{i=1}^{t} \cos\theta_i,$$

$$\mu_\theta = \arctan\left(\frac{\mu_s}{\mu_c}\right),$$

$$\sigma_\theta = \sqrt{\frac{1}{t-1}\sum_{i=1}^{t} [\min(|\theta_i - \mu_\theta|, 360 - |\theta_i - \mu_\theta|)]^2}, \qquad (3)$$

where $\theta_i$ is an angle corresponding to an $i^{th}$ minutia. If there is no minutia in a particular region, then the average minutia measures use the value corresponding to the center of the region, and the average deviation measures are set to zero. The deviation measures are also set to zero when there is only a single minutia detected inside the region.

Ridge Wavelength

In another embodiment, the binary logical condition includes determining an average ridge wavelength and binarizing the average wavelength with respect to a threshold. For example, in one variation of this embodiment, a median value of average wavelength for the region computed over database of fingerprints is used as a threshold. The average wavelength is an embodiment of an aggregate measure computed from the ridge image.

The average ridge wavelength can be determined in a number of ways. In one embodiment, the ridge image is subjected to morphological thinning and thickening operations which enhance the ridges in the image. Then, a pixel on the ridge map is selected and a line is drawn perpendicular to the ridge direction. Distances measured along this line give the distance between the fingerprint ridges, also called an inter-ridge distance. The mean value of the inter-ridge distance is defined as the ridge wavelength at that pixel on the ridge map.

After finding the ridge wavelength at each pixel inside a local region, the average of the ridge wavelengths is stored as the aggregate measure of the region. This feature aggregation measure is binarized using a median value computed over the entire database. In some embodiments, the ridge wavelengths below a certain minimum value and above a certain maximum value are disregarded to provide robustness to noise.

Ridge Orientation

In another embodiment, the binary logical condition includes determining a standard deviation of directional features extracted from the ridge orientation and binarizing the standard deviation with respect to a threshold. In one embodiment, the threshold is determined as a median value of standard deviations computed in the region for the database of fingerprints.

In one variation of the embodiment, the ridge image is first enhanced by convolving the fingerprint image with a Gabor filter kernel. The Gabor filter kernels are specified by their direction, and, e.g., eight filters are used to obtain eight different filtered outputs. Then, the filtered outputs corresponding to the directions closest to the ridge direction are linearly combined to give the enhanced ridge image.

The enhanced ridge image is used to convolve with directional filters. In one embodiment, Gabor filters are used. In one embodiment, after convolving the enhanced ridge map in the interior of the region with a Gabor filter, the standard deviation of the filtered output values is computed. This standard deviation is the aggregate measure extracted from the ridge map. In one embodiment, this aggregate measure is binarized using as threshold the median of the standard deviation of the filtered output values computed for all fingerprints in the database for the region under consideration.

By using more than one directional filters, the embodiment extracts standard deviation numbers corresponding to more than one directions for the region. In one embodiment, Gabor filters corresponding to four directions are used for each region, resulting in the extraction of four such standard deviation features from each region, which in turn results in the extraction of four bits from ridge orientations in each region.

Binarizations

FIGS. 6A-6C show several types of binarizations according to embodiments of the invention. In FIG. 6A, a threshold 601 is applied to all values of the intermediate feature vector 520 to produce the binary feature vector 150. The threshold can be the same for all bit positions or vary for each position.

In FIG. 6B, a random projection 604 onto an orthonormal basis is first applied to the intermediate feature vector, where this random projection is the same for all fingerprints. The results of this projection are then subject to the thresholding process to produce the binary feature vector. Instead of a random projection, other linear or non-linear transformations can be used to improve the separation of samples acquired from genuine users and impostors, e.g., principal component analysis, and linear discriminant analysis.

In FIG. 6C, the intermediate feature vector is first normalized 605, then a set of random projections (RP) 606 are applied for each user, followed by the thresholding 601 for each random projection. The threshold can be the same for each projection or vary among the projections. This is then followed by a concatenation 607 to produce the binary feature vector 150.

Selection of Discriminable Features

Some embodiments of the invention reduce the size of the binary feature vector by selecting discriminable features to optimize the trade off between false reject rates and false accept rates.

One embodiment reduces the size by deleting correlated bits. In one variation of this embodiment, the correlated bits are deleted using the following steps:

(1) computing pairwise correlation between all possible pairs of bits in the binary feature vectors computed for all users in the database. In one embodiment, the correlation between a pair of bit positions is measured by computing the probability of "00", "01", "10" and "11" bit-pairs in the binary feature vectors of some or all users in the database, and then computing the pairwise entropy. Then, the pair with the lowest pairwise entropy has the highest pairwise correlation.

(2) selecting a pair of bits having the highest correlation;

(3) deleting the bit from this pair whose maximum correlation with the other bits is greater; and (4) repeating steps 2 and 3 until a desired number of nearly uncorrelated bits is obtained.

Another embodiment deletes bits with low discriminability, wherein discriminability is a probability of disagreements between genuine matches less the probability of disagreement between imposter matches. In this embodiment, the discriminability ($d_i$) of each bit in the binary feature vector is determined according to $$d_i = I_i - G_i \qquad (4)$$

where $G_i$ is a fraction of times when the $i^{th}$ bit disagrees for the genuine matches and $I_i$ is a fraction of times when the $i^{th}$ bit disagrees for the impostor matches. Here, genuine match refers to comparisons between binary feature vectors determined from the same fingerprint. Imposter matches refers to comparisons between feature vectors obtained from different fingers or users.

Discriminability of bits extracted from a fingerprint is an important measure of the reliability with which the bits can to identify the legitimate user. According to the definition provided above, a bit that disagrees for genuine matches with low probability and disagrees for imposter matches with high probability has high discriminability. Thus, the bits with high discriminability can be used reliability to separate a legitimate user from an illegitimate user.

In another embodiment, a weighted combination of $G_i$ and $I_i$ are used in Equation (4) to define discriminability. Yet another embodiment uses both correlation-based and discriminability-based pruning described above to prune the binary feature vector.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transforming a biometric of a user to a binary feature vector suitable for user authentication, comprising steps of:

partitioning the biometric into a set of regions, wherein each region is a contiguous region confining a part of the biometric;

determining, for each region, biometric parameters of the region as a summation of the closest distance of each minutia of the region from the boundary of the region and a tolerance value of the summation;

applying, for each region, a binary logical condition to the biometric parameters of the region to produce at least one bit of the binary feature vector, wherein the applying is performed by a processer; and authenticating the biometric of the user based on the binary feature vector.

2. The method of claim 1, wherein the applying further comprising:
   determining coordinates of an average minutia in the region; and
   binarizing the coordinates based on a coordinate threshold.

3. The method of claim 1, wherein the biometrics are represented by an image of a fingerprint.

4. The method of claim 1, further comprising:
   representing the biometrics with a minutia map or a ridge map, wherein the minutia map includes locations and orientations of minutiae, and the ridge map includes an image of ridges of a fingerprint.

5. The method of claim 1, wherein the biometric parameters of the region are coordinates of minutiae confined by the region.

6. A system for transforming a biometric of a user to a binary feature vector suitable for user authentication, comprising:
   means for partitioning the biometric into a set of regions, wherein each region includes a part of the biometric;
   means for determining, for each region, biometric parameters of the region;
   a processor configured to apply, for each region, binary logical conditions to the biometric parameters of the region to produce bits of the binary feature vector and to reduce a size of the binary feature vector by deleting bits with low discriminability, wherein the discriminability is difference of a probability of disagreement between genuine matches and a probability of disagreement between imposter matches; and
   a memory for storing the binary feature vector.

7. The system of claim 6, wherein the processor determines the discriminability ($d_i$) of each bit i in the binary feature vector according to $$d_i = I_i - G_i,$$

wherein $G_i$ is a fraction of times when $i^{th}$ bit disagrees for genuine matches and $I_i$ is a fraction of times when the $i^{th}$ bit disagrees for impostor matches.

8. The system of claim 7, wherein the discriminability ($d_i$) of each bit i in the binary feature vector is determined based on a weighted combination of $G_i$ and $I_i$, wherein $G_i$ is a fraction of times when $i^{th}$ bit disagrees for genuine matches and $I_i$ is a fraction of times when the $i^{th}$ bit disagrees for impostor matches.

9. The method of claim 1, further comprising:
   minimizing correlation of the regions in the set of regions.

10. The method of claim 9, further comprising:
    wherein the set of regions comprises overlap regions
    determining a pair of regions having highest relative overlap; and
    deleting a region in the pair of regions having a larger maximum relative overlap with all other regions.

* * * * *